United States Patent [19]

Mungle et al.

[11] 4,026,978
[45] May 31, 1977

[54] METHOD OF MAKING ASYMMETRIC CELLULOSE TRIACETATE MEMBRANES

[75] Inventors: Charles R. Mungle; Ronald L. Fox, both of San Diego, Calif.

[73] Assignee: The United States of America as represented by the Secretary of the Interior, Washington, D.C.

[22] Filed: July 17, 1975

[21] Appl. No.: 596,883

[52] U.S. Cl. ............................... 264/41; 106/176; 106/187; 210/500 M; 264/217
[51] Int. Cl.$^2$ ................ B29D 27/04; B29D 27/20; B01D 39/00
[58] Field of Search ............ 264/41, 49, 217; 210/500 M; 106/176, 187

[56] References Cited

UNITED STATES PATENTS

| | | | |
|---|---|---|---|
| 3,497,072 | 2/1970 | Cannon | 264/49 X |
| 3,846,404 | 11/1974 | Nichols | 264/41 X |
| 3,878,276 | 4/1975 | Hoernschemeyer | 264/41 |
| 3,883,626 | 5/1975 | Kamide et al. | 264/41 X |
| 3,884,801 | 5/1975 | Kesting | 264/41 X |
| 3,917,777 | 11/1975 | Asada et al. | 264/41 |

*Primary Examiner*—Philip Anderson
*Attorney, Agent, or Firm*—William S. Brown; Donald A. Gardiner

[57] ABSTRACT

Asymmetric cellulose triacetate semipermeable membranes cast from a solution of cellulose triacetate having an acetyl content of at least 43 percent in a solvent mixture having a ratio of dioxane to acetone of at least about 1.5 to 1, which solution also contains a swelling agent in the form of a low molecular weight alcohol or a low molecular weight mono- or poly-basic acid. Solvent is evaporated from one surface of the cast film to form a dense gel layer and the film is immersed in water to provide an asymmetric semipermeable membrane having a high salt-rejection capability and good flux.

6 Claims, No Drawings

METHOD OF MAKING ASYMMETRIC CELLULOSE TRIACETATE MEMBRANES

BACKGROUND OF THE INVENTION

Asymmetric semipermeable membranes suitable for use in reverse osmosis processes for producing potable water from brackish or saline water have been known for sometime. Such asymmetric membranes have a thin, dense permselective surface layer supported by a much thicker porous layer of the same polymeric material. Processes for making such asymmetric membranes from cellulose diacetate are disclosed in U.S. Pat. Nos. 3,133,132 and 3,133,137 issued to Loeb et al on May 12, 1964. Since the issuance of the Loeb et al patents, there has been a substantial amount of work done in this area of asymmetric semipermeable membranes, and cellulose diacetate has been one of most intensely investigated polymers for making such membranes. For example, U.S. Pat. No. 3,497,072, issued Feb. 24, 1970 to Cannon, discloses a method for preparing such an asymmetric membrane from cellulose diacetate in a very narrow range of acetyl content. However, these cellulose diacetate membranes are somewhat limited in achieving very high rejection capability and are also vulnerable to hydrolysis when used with aqueous feed solutions having either high or very low pH values. Accordingly, cellulose diacetate membranes have not proved to be economically practical for use in seawater desalinization installations.

SUMMARY OF THE INVENTION

It has been found that it is possible to select a suitable solvent system and use it to prepare asymmetric membranes from cellulose triacetate which will have a rejection capability superior to that previously obtained by commercial cellulose diacetate casting methods. These high-rejection, asymmetric, cellulose triacetate membranes can be cast from solutions containing at least 11 weight percent of cellulose triacetate dissolved in a mixture of dioxane and acetone with a ratio of dioxane to acetone at least about 1.5 to 1. The casting solution should also contain an organic swelling agent that is mutually soluble in the dioxane-acetone mixture and in the aqueous gellation medium that is used, for example methanol, ethanol, maleic acid and acetic acid. Casting is usually carried out under conditions so as to continuously produce a layer about 0.1 millimeter thick at a temperature of about 22° C., and evaporation from the upper surface of the cast film is carried out for between about 25 and 90 seconds. Gelling is then accomplished by immersion in water to remove the remaining solvents and swelling agents, and annealing is not necessary to achieve the high-rejection capability.

DESCRIPTION OF THE PREFERRED EMBODIMENTS

Cellulose has three hydroxyl groups on each of the glucose units in the molecule, and in producing cellulose derivatives these hydroxyl groups are replaced either in whole or in part. In what is commonly known as cellulose acetate, there are substitutions of acetyl groups for between about 2.3 and about 3.0 of these hydroxyl groups to create a product which may be referred to as having from about 53 to about 62.5 percent combined acetic acid, or as containing from about 38.1 to about 44.9 weight percent acetyl. Generally, cellulose triacetate (CTA) is considered to constitute that degree of substitution wherein the acetic acid content ranges from about 60 to 62.5 percent of from about 43 to about 45 weight percent acetyl. One commercial test is that cellulose triacetate is soluble in chloroform while cellulose diacetate is not; on the other hand, cellulose diacetate is soluble in acetone while cellulose triacetate is not. Because of its limited solubility, cellulose triacetate has not found a great number of commercial applications, and likewise cellulose triacetate has not heretofore proved to be useful for producing commercially suitable asymmetric semipermeable membranes for reverse osmosis separation processes. A process has now been found for casting asymmetric semipermeable membranes from cellulose triacetate dissolved in a carefully balanced solvent mixture.

A casting solution is formed which utilizes a carefully balanced mixture of 1,4 dioxane and acetone, together with a minor portion of a swelling agent. Dioxane constitutes the major solvent and is employed in a weight ratio to acetone of at least about 1.5 to 1, and when it is used in an amount not greater than about 2.5 to 1, it has been found that annealing treatment is unnecessary. With this solvent mixture as its base, the total casting solution should contain between about 11 and about 18 weight percent of CTA. Preferably, the CTA has an acetyl content between about 43.5 and about 44.5 weight percent, and preferably the casing solution is formed so that it contains between about 15.5 and about 16.5 weight percent of CTA. Cellulose triacetate within this acetyl range is commercially available from various manufacturers, for example, from Eastman as A435-85 and A435-90 and from Hercules Limited (England) as TR and TH. The casting solution is usually maintained at a temperature between about 0° C. and 30° C., and it preferably has a viscosity between about 700 and about 1500 poises. Dioxane may also be used in a ratio to acetone between about 3.3 to 1 and about 4.3 to 1; however, the resultant membranes are then annealed to provide the selectively desired.

It is known in such casting processes for making asymmetric membranes to include organic swelling agents which contribute to the formation of membranes having desired selectively. Methanol, ethanol and other low molecular weight alcohols constitute one such group of swelling agents and may be included in an amount up to about 16 weight percent of the final solution. Preferably methanol is employed in an amount of at least about 2 weight percent and not more than about 10 weight percent. Another group of swelling agents that may be used include low molecular weight mono- and polybasic acids, like oxalic acid, maleic acid and acetic acid, and maleic acid is preferred. When maleic acid is used, it is preferably employed in an amount between about 1 and about 3 weight percent, with about 2.35 percent being preferred. Preferably, a mixture of swelling agents, one from each of these two groups, is employed.

The addition of small amounts of certain polyalcohols, for example, glycerol and triacetate glycerol, has improved the transport properties of the resultant asymmetric membranes. Other organic acetates, such as sucrose octaacetate and ethyl acetoacetate, as well as glycerol monoacetate and ethylene glycol diacetate, when added to the casting solution, have resulted in certain increases in the transport properties. Generally, such addition may be at a level up to about 3 weight percent, and usually about 2 weight percent of such an additive is used.

Casting is generally carried out upon a reinforcing cloth substrate, which will then be part of the ultimate membrane assembly; but, if desired, a film may be cast upon a glass plate, a drum or a moving belt. The ability to cast onto a reinforcing fabric contributes a substantial advantage in the utilization of the membrane, and all test results reported hereinafter refer to membranes fabricated in this manner. The solution may be extruded or simply allowed to flow by gravity onto the substrate to form a film thickness of not more than about 0.2 mm., and generally the thickness of the cast film will not exceed about 0.1 mm. The dense permeselective thin layer is created as a result of the initial solvent evaporation from the exposed surface of the cast film, and the length of time of evaporation is important. However, it should be understood that the evaporation time will vary with the casting solution temperature and the velocity and composition of the atmosphere because the volatility of the solvents in the casing solution is influenced by these variables. If the casting solution is maintained at a temperature between about 15° C. and about 25° C., evaporation is carried out for between about 25 seconds and 90 seconds, and preferably, between about 30 seconds and 50 seconds, prior to immersion.

Immersion of the cast film of course halts the evaporation process, and the remaining solvent, the swelling agent and any additives are leached from the gelling membrane by their miscibility with water. Normally, water is used as the immersion liquid, and although the temperature of the water is not considered to be particularly important, usually a water bath at 0° C. to room temperature is employed. Annealing of the membranes is not required when a solvent ratio of 1.5 to 2.5 is used; however, when membranes are cast from a solution using the higher solvent ratio hereinbefore specified annealing at a temperature of between about 80° C. and 90° C. is utilized.

Testing at 1000 p.s.i.g. applied pressure using a seawater feed shows that asymmetric semipermeable membranes can be fabricated which will exhibit a salt-rejection capability above 98.5 percent, and often above 99 percent, which is unexpectedly high for unannealed asymmetric membranes. Operating at rejection rates of this magnitude, the water flux, which is measured in gallons per square foot per day (GFD), will exceed 8 GFD and may often reach 10 GFD and higher. Membranes exhibiting rejection rates and water fluxes of this magnitude on seawater at 1000 p.s.i.g. are considered to be suitable for the production of potable water from seawater in a single pass arrangement.

The following Examples set forth the best modes presently contemplated by the inventors for carrying out their invention. However, it should be understood that these Examples are only exemplary and do not constitute limitations upon the scope of the invention which is set forth in the appended claims.

EXAMPLE I

A casting solution is prepared from cellulose triacetate manufactured by the Eastman Chemical Company and designated as A-432-130B which denotes an acetyl content of 43.2 weight percent which is equal to a substitution of about 2.83 out of every three hydroxyl groups on the glucose units. The CTA is dissolved in a solvent mixture containing a major portion of 1,4 dioxane and a lesser amount of acetone as the first step in forming a casting solution having the following composition:

| Cellulose triacetate | 16.4 w/o |
|---|---|
| Dioxane | 45.1 w/o |
| Acetone | 28.7 w/o |
| Methanol | 7.4 w/o |
| Maleic Acid | 2.4 w/o |

The cellulose triacetate polymer is added to the mixture of dioxane and acetone and stirred while covered for about one-half hour in a high sheer dispersator. Methanol and maleic acid are then added, and mixing is continued for a few minutes. The entire mixing process takes about one hour. The amount of solvent lost during the mixing process is measured, and replacement of evaporated solvent in accordance with the relative volatilities of the solvent components is carried out. Laboratory analysis of the resultant solution shows it is consistently within plus or minus 0.5 percent of the desired percentages listed above.

The casting solution is maintained at a temperature of about 22° C., and casting is carried out by continuously forming a film about 0.1 mm. thick on a moving woven polyester support fabric. The speed of the fabric is maintained such that evaporation is carried out for about forty seconds into a circulating $N_2$ atmosphere at room temperature. Following evaporation, the film is gelled by immersing in a water bath at about 1° C., and thereafter rinsing is carried out for a sufficient time to remove all of the remaining solvent and the swelling agents, using water at a temperature of about 22° C.

The resultant membrane is tested by selecting portions of the membrane from the continuous length and testing these random samples using a synthetic seawater feed containing about 20,000 mg. per liter of chloride ion at a pressure of about 1000 p.s.i.g. Testing is carried out for a period of about 1 hour, and the membrane shows a chloride ion rejection of about 96.5 percent and a flux of about 9.2 GFD. The membrane is considered to be suitable for use in a seawater desalinization unit because the cellulose triacetate membrane is excellently resistant to hydrolysis over a wide range of pH for the feed and/or potential cleaning solutions.

EXAMPLE II

The process of Example I is repeated utilizing 16.4 weight percent of Eastman CTA 435-85-B as the cellulose triacetate material, and the conditions are otherwise duplicated. Testing is carried out in the same manner of Example I and shows a chloride ion rejection of 99.4 percent after testing for eighteen hours and a water flux of 5.3 GFD. The high salt rejection exhibited by the membrane makes it suitable for the production of potable water in a single-stage seawater desalinization unit.

EXAMPLE III

The procedure of Example I is repeated but substituting Hercules cellulose triacetate TH, which has a combined acetic acid content of about 61 percent, which is equal to an acetyl content of about 43.8 weight percent, and the conditions are otherwise duplicated. The testing shows a 98.5 percent chloride ion rejection and a water flux of 6 GFD.

EXAMPLE IV

The process of Example I is repeated substituting Hercules CTA TR, which polymer has a combined acetic acid content from about 60.5 percent to about 62 percent (which is equal to an acetyl content of from about 43.5 to about 44.5). Casting is carried out using an evaporation time of about 40 seconds, and testing is carried out for about 68 hours. The results of the testing show a percent chloride ion rejection of about 99.4 percent and a flux of about 6.4 GFD.

EXAMPLE V

The process of Example I is repeated utilizing 16.4 weight percent of Eastman CTA 435-85-B as the cellulose triacetate material and omitting the maleic acid. Otherwise the conditions are duplicated. Testing is carried out in the same manner as in respect to Example I and shows a chloride ion rejection of 98 percent and a water flux of 9 GFD.

EXAMPLE VI

The process of Example I is repeated utilizing 16.4 weight percent of Eastman CTA 435-85-B as the cellulose triacetate material and omitting the methanol. Otherwise, the conditions are duplicated. Testing is carried out in the same manner as in respect to Example I and shows a chloride ion rejection of 96 percent and a water flux of 10 GFD.

EXAMPLE VII

A casting solution is prepared from cellulose triacetate manufactured by the Eastman Chemical Company and designated as A-435-85B which denotes an acetyl content of 43.5 weight percent. The CTA is dissolved in a solvent mixture containing a major portion of 1,4 dioxane and a lesser amount of acetone as the first step in forming a casting solution having the following composition:

| | |
|---|---|
| Cellulose triacetate | 16.0 w/o |
| Dioxane | 62.4 w/o |
| Acetone | 16.3 w/o |
| Methanol | 2.9 w/o |
| Maleic Acid | 2.4 w/o |

The formulation procedure is the same as set forth in Example I, and results in a solution having a ratio of dioxane to acetone of about 3.8 to 1.

The casting solution is maintained at a temperature of about 20° C., and casting is carried out by continuously forming a film about 0.1 mm. thick on a moving woven polyester support fabric. The speed of the fabric is maintained such that evaporation is carried out for about forty seconds into a circulating $N_2$ atmosphere at room temperature. Following evaporation, the film is gelled in a water bath at about 1° C., and thereafter rinsing is carried out for a sufficient time to remove all of the remaining solvent and the swelling agents, using water at a temperature of about 22° C. Thereafter, the resultant membrane is annealed by immersion in water at about 85° C. for about 5 minutes, which annealing improves the compaction-resistance of the membrane.

Testing is carried out in the same manner as in Example I for a period of about 24 hours, and the membrane shows a chloride ion rejection of about 99 percent and a flux of about 10 GFD which is considered to be very good. The membrane is considered to be well suited for use in a single-pass seawater desalinization unit.

Although the invention has been described with regard to certain preferred embodiments, it should be understood that various modifications as would be obvious to one having the ordinary skill in the art may be made without deviating from the scope of the invention which is defined solely by the appended claims. Various of the features of the invention are set forth in the claims which follow.

What is claimed is:

1. A method for making an asymmetric cellulose triacetate semipermeable membrane, which method comprises forming a solution of cellulose triacetate having an acetyl content of 43.5 percent, by dissolving said cellulose triacetate in a solvent mixture of acetone and dioxane wherein said casting solution contains a ratio of dioxane to acetone of about 3.8 to 1 and also contains a swelling agent consisting of a mixture of methanol and maleic acid, casting said solution to form a film, evaporating solvent from one surface of said film for sufficient time to form a dense gel layer at said surface, and then treating said film with water to form a gel, and thereafter annealing said gelled film by immersion in water at a temperature of about 85° C, to thereby provide an asymmetric semipermeable membrane having a high salt-rejection capability and good flux.

2. A method for making an asymmetric semipermeable membrane in accordance with claim 1 wherein said evaporation is carried out for between about 25 and about 90 seconds.

3. A method for making a semipermeable membrane in accordance with claim 2 wherein said evaporation is carried out at a temperature between about 15° C. and about 35° C.

4. A method for making a semipermeable membrane in accordance with claim 3 wherein said solution being cast is maintained at a temperature of between about 0° C. and about 30° C.

5. A method for making an asymmetric semipermeable membrane in accordance with claim 1 wherein said solution contains cellulose triacetate in an amount between about 11 and about 18 weight percent.

6. A method for making a semipermeable membrane in accordance with claim 1 wherein said solution contains cellulose triacetate in an amount between about 15.5 and about 16.5 weight percent and has a viscosity between about 200 and about 2000 poises at the temperature at which casting takes place.

* * * * *